No. 621,504. Patented Mar. 21, 1899.
O. M. J. RAMSEY.
CUSHION TIRE.
(Application filed Feb. 25, 1898.)
(No Model.)
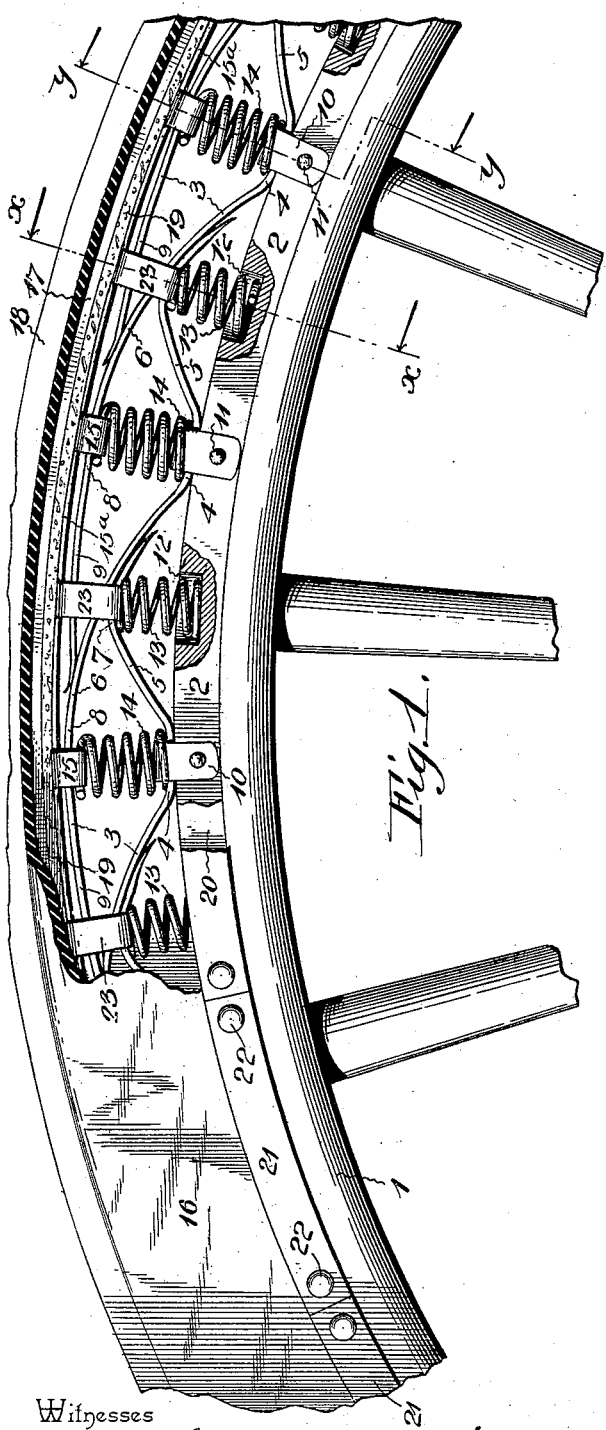
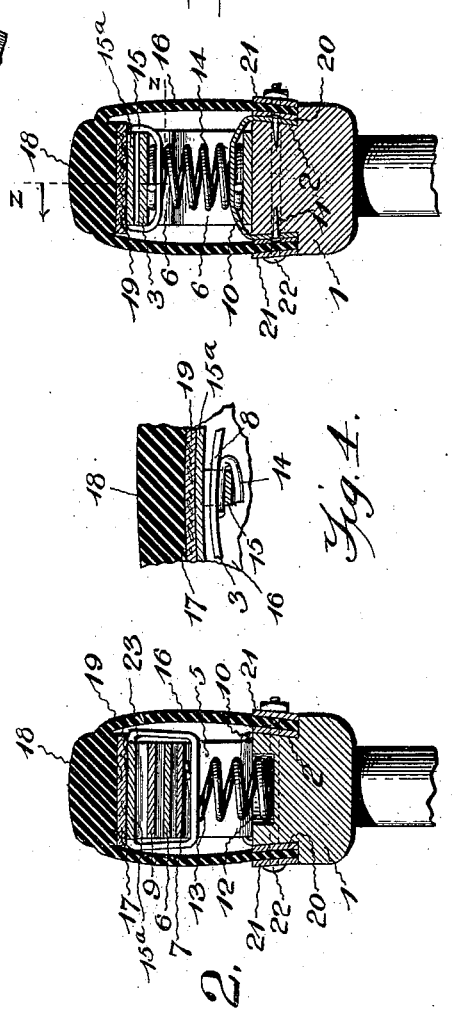
Inventor
Ole M. J. Ramsey.
Witnesses
J. Frank Culvirwell,
Edwin Cruse.
By his Attorneys,
C. A. Snow & Co.

UNITED STATES PATENT OFFICE.

OLE MARTIN JERGENSEN RAMSEY, OF ELLINGER, TEXAS.

CUSHION-TIRE.

SPECIFICATION forming part of Letters Patent No. 621,504, dated March 21, 1899.

Application filed February 25, 1898. Serial No. 671,600. (No model.)

*To all whom it may concern:*

Be it known that I, OLE MARTIN JERGENSEN RAMSEY, a citizen of the United States, residing at Ellinger, in the county of Fayette and State of Texas, have invented a new and useful Cushion-Tire, of which the following is a specification.

This invention relates to cushion-tires for bicycles or other vehicles, its object being to provide a series of overlapping curved plate-springs and also a series of coiled springs between the rim of the wheel and the tread portion of the tire and to so arrange and secure such springs in position that they can be easily and separately removed and replaced when desired without necessitating the removal of the tire from the rim.

With these objects in view the invention consists in the peculiar arrangement of the plate and coiled springs relatively to each other between the tire and the rim and in the manner of securing the tire to the rim over the springs and also in the special devices for excluding moisture from the interior of the tire.

The invention will be fully described hereinafter and its novel features pointed out in the claims.

In the drawings, Figure 1 is a sectional side elevation of a portion of a wheel embodying my invention. Fig. 2 is a transverse section on the line $x$ $x$ of Fig. 1. Fig. 3 is a similar view on the line $y$ $y$ of Fig. 1. Fig. 4 is a detail section on the line $z$ $z$ of Fig. 3, looking in the direction of the arrow.

Similar reference-numerals indicate similar parts in the several figures.

1 indicates the rim of the wheel, which may be of wood or metal, as preferred, and is provided on each side with a rabbet 2, extending circumferentially around it.

3 indicates plate-springs made from sheet spring metal, which are bent or curved, as indicated at 4, at a point nearer one end of the blank than the other, to form diverging wings 5 and 6, the former being shorter than the latter. The short wing is reversely curved near its outer end, as indicated at 7, and the long wing 6 is also reversely curved at its middle portion, as indicated at 8, while its outer end portion may be straight or slightly curved in a direction opposite to the curvature 8, as indicated at 9. Each of these springs 3 is seated at the bend or curve 4 upon the periphery of the rim and secured in place by a strap 10, which fits over it and is secured in recesses 11 to be flush with the rim. The springs 3 are so arranged that the long wing 6 of one spring will overlap at its outer end the outer end of the wing 5 of the second spring in advance of it, and the overlapped ends will be on opposite sides of the long wing 6 of the intermediate spring and in engagement therewith, such points of engagement being to one side of the extreme outer curvature of the intermediate long wing and clearly shows in Fig. 1.

A series of recesses 12 are formed in the periphery of the rim immediately opposite the said overlapping ends and form seats for the coiled springs 13, which engage at their outer ends the curved outer ends of the short wings of the respective springs. Another series of coiled springs 14 are respectively seated in the bends or curves 4 of the respective springs and engage at their upper ends the overlying long wings 6 of the adjacent springs. The lower ends of the springs 14 will preferably be secured by the respective straps 10 and their upper ends by clips 15. These clips are soldered or otherwise secured to the respective springs 14 and embrace the end portions of adjacent sections comprising the band $15^a$, and the wings 6 of the plate-springs pass loosely through the clips to have free endwise movement therein. The band $15^a$ is composed of sections and may be of any suitable material, metal, or fabric, and its sections are held in position relatively to one another under varying conditions of the tire by means of the clips 15.

The tire consists of the cover 16, formed from a strip of comparatively thin and elastic rubber or other waterproof material reinforced or thickened at its middle or tread portion to form projecting ribs 17 and 18 on its inner and outer sides, respectively. These ribs will preferably be somewhat wider than the plate-springs 3 in order that the edges of the latter will not come in contact with the thin portions of the cover. Between the inner rib 17 and the band $15^a$ a strip of cork or similar absorbent material 19 is interposed and is designed to absorb any moisture that may possibly find its way through the tread portion of the tire, and thereby protect the springs from the deleterious effects of such moisture.

The edges of the tire 16 are designed to seat in the rabbets 2, and flat packing-rings 20, of rubber or other waterproof material, will be inserted between said edges and the sides of the rim, and in order to secure the tire to the rim I employ the flat metal rings 21 on each side of the rim, which are secured to the sides of the rim, outside the edges of the cover, by screws or bolts, (indicated by 22.) The rings 21 are made up of a series of sections for the reason that should it be necessary to remove any of the springs one or more of the sections may be removed and the edge of the tire turned up to give access to such springs without in any manner disturbing the other portions of the tire. When the metal rings 21 are tightly secured to the rim, the packing-rings 20 will make a water-tight joint, and the springs will thus be entirely protected from moisture. When the several parts are in position, the outer ends of the tire will be flush with the outer face of the rings 21, and the outer edges of the rings 21 will also preferably be parallel with the periphery of the rim.

Tires made in accordance with my invention may be used on bicycles or other vehicles and will not be liable to collapse or give way under any ordinary conditions, since if one or more of the springs should be broken or otherwise rendered inefficient the tire would not thereby be rendered entirely useless, as is the case when a pneumatic tire is punctured or otherwise collapsed.

The coil-springs 13 have clips 23 soldered or otherwise firmly connected therewith, and these clips embrace the subjacent parts of the plate-springs and the band 15ª in line with the coil-springs 13, so as to prevent relative lateral displacement of the parts and insure unison of movement thereof. The terminals of the plate-springs are made tapering to avoid projecting corners, which would work injury to the parts coming in contact therewith as the tire rolls over a surface and sustains the load.

It will be understood that changes in the form, proportion, and the minor details of construction may be resorted to without departing from the spirit or sacrificing any of the advantages of this invention.

Having thus described the invention, I claim—

1. In a cushion-tire, the combination with a wheel-rim, of a series of plate-springs supported on the periphery of the rim and bent or curved to form diverging wings one of which is longer than the other, each wing being curved reversely to the curve at their junction, and said springs being so arranged that the outer end of the short wing of one spring overlaps the outer end of the long wing of the second spring in advance thereof, and the overlapping ends being on opposite sides of the long wing of the intermediate spring, and a tire secured to the rim over the springs, substantially as described.

2. In a cushion-tire, the combination with a wheel-rim, of a series of plate-springs supported on the periphery of the rim and bent or curved to form diverging wings one of which is longer than the other, each wing being curved reversely to the curve at their junction, and said springs being so arranged that the outer end of the short wing of one spring overlaps the outer end of the long wing of the second spring in advance thereof, and the overlapping ends being on opposite sides of the long wing of the intermediate spring, a series of coiled springs interposed between the respective overlapping ends of the plate-springs and the periphery of the rim, and a tire secured to the rim over the springs, substantially as described.

3. In a cushion-tire, the combination with a wheel-rim, of a series of plate-springs supported on the periphery of the rim and bent or curved to form diverging wings one of which is longer than the other, each wing being curved reversely to the curve at their junction, and said springs being so arranged that the outer end of the short wing of one spring overlaps the outer end of the long wing of the second spring in advance thereof, and the overlapping ends being on opposite sides of the long wing of the intermediate spring, a series of coiled springs interposed between the respective overlapping ends of the plate-springs and the periphery of the rim, a series of coiled springs seated at their inner ends in the respective curves at the junction of the long and short arms of the plate-springs and engaging at their upper ends the long wings of adjacent springs, and a tire secured to the rim over the springs, substantially as described.

4. In a cushion-tire, the combination with a wheel-rim, of a series of plate-springs supported on the periphery of the rim and bent or curved to form diverging wings, one of which is longer than the other, said springs being so arranged that the outer end of the short wing of one spring overlaps the outer end of the long wing of the second spring in advance thereof, and the overlapping ends being on opposite sides of the long wing of the clamp-spring, a circumferential band exterior of the springs, a series of clips secured to the band and through which clips the long wings of the respective springs loosely pass, and a tire secured to the rim over the said band and springs, substantially as described.

5. In a cushion-tire, the combination of a wheel-rim, a tire, a series of plate-springs secured between their ends to the rim and having their end portions outwardly divergent and overlapping, coil-springs interposed between the rim and the outwardly-deflected parts of the plate-springs, a band subjacent to the inner side of the tire and composed of sections, and clips secured to the coil-springs and connecting the ends of adjacent sections of the said band and having the plate-springs working loosely therethrough, substantially as described.

6. In a cushion-tire, the combination with a wheel-rim and a tire, of coiled springs interposed between the rim and the tire and secured to the rim by clips engaging the springs and the opposite sides of the rim, and sectional bands or rings covering and protecting and engaged with the ends of the clips, substantially as shown and described.

7. In a cushion-tire, the combination of a wheel-rim, a tire, and a series of plate-springs, each plate being bent intermediate its ends forming oppositely-extending spring-arms and connected to the rim at its bent portion, the oppositely-extending arms of each adjacent spring overlapping and bridging the intervening space between the respective springs, coiled springs interposed between the rim and the overlapping portions of the arms of the springs, and clips engaging the coiled springs and embracing the overlapping portions of the spring-arms, substantially as shown and described.

8. In a cushion-tire, the combination of a wheel-rim, a tire, and a series of plate-springs, each spring being bent intermediate its ends forming oppositely-extending spring-arms and connected to the rim at its bent portion, the oppositely-extending arms of each adjacent spring overlapping and bridging the intervening space between the respective springs, and two sets of coiled springs arranged around the rim and disposed in alternate series, one set at the point where the plate-springs are bent and secured to the rim and the other set at the point where the spring-arms overlap, substantially as shown and described.

In testimony that I claim the foregoing as my own I have hereto affixed my signature in the presence of two witnesses.

OLE MARTIN JERGENSEN RAMSEY.

Witnesses:
ALBERT F. WEBER,
THOMAS WALTON MOORE.